(12) United States Patent
Aoki

(10) Patent No.: US 8,885,089 B2
(45) Date of Patent: Nov. 11, 2014

(54) IMAGING DEVICE AND FOCUSING CONTROL METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/227,599

(22) Filed: Mar. 27, 2014

(65) Prior Publication Data

US 2014/0211079 A1 Jul. 31, 2014

Related U.S. Application Data

(63) Continuation of application No. PCT/JP2012/072942, filed on Sep. 7, 2012.

(30) Foreign Application Priority Data

Sep. 28, 2011 (JP) ................................ 2011-213129

(51) Int. Cl.
*G03B 13/00* (2006.01)
*H04N 5/228* (2006.01)
*H04N 5/225* (2006.01)
*H04N 5/232* (2006.01)
*H04N 5/335* (2011.01)

(52) U.S. Cl.
CPC .......... *H04N 5/23212* (2013.01); *H04N 5/335* (2013.01)
USPC .................... 348/345; 348/208.12; 348/220.1

(58) Field of Classification Search
None
See application file for complete search history.

(56) References Cited

U.S. PATENT DOCUMENTS

| 2008/0291311 | A1 | 11/2008 | Kusaka |
| 2010/0302433 | A1 | 12/2010 | Egawa |
| 2011/0076001 | A1* | 3/2011 | Iwasaki ......................... 396/114 |
| 2012/0044406 | A1* | 2/2012 | Shimoda et al. .............. 348/345 |

FOREIGN PATENT DOCUMENTS

| JP | 2008-72470 A | 3/2008 |
| JP | 2008-263352 A | 10/2008 |
| JP | 2009-128579 A | 6/2009 |

(Continued)

OTHER PUBLICATIONS

Written Opinion of the International Searching Authority (including English language translation thereof), mailed Nov. 6, 2012, for International Application No. PCT/JP2012/072942.

(Continued)

*Primary Examiner* — Lin Ye
*Assistant Examiner* — Euel Cowan
(74) *Attorney, Agent, or Firm* — Birch, Stewart, Kolasch & Birch, LLP

(57) ABSTRACT

An imaging element with rolling shutter drive has pixels that each receive one or the other of a pair of light bundles passing through an aperture area for an imaging lens. The pixels are disposed on a first line arranged in the X direction, and the pixels are disposed on a second line in the X direction, alternating in the Y direction. A control unit uses a signal group from the pixels on a line in FIG. 2, a signal group from the pixels on a line, and a signal group from pixels on a line to control imaging lens focus on the basis of the phase difference information found from the amount of phase difference between the signal groups and the amount of phase difference between the signal groups.

10 Claims, 7 Drawing Sheets

(56) References Cited

FOREIGN PATENT DOCUMENTS

| JP | 2009-21752 A | 9/2009 |
| JP | 2010-152161 A | 7/2010 |
| JP | 2011-77829 A | 4/2011 |

OTHER PUBLICATIONS

PCT/ISA/210 ; mailed on Nov. 6, 2012, issued in PCT/JP2012/072942.

* cited by examiner

IMAGING DEVICE AND FOCUSING CONTROL METHOD

CROSS-REFERENCE TO RELATED APPLICATIONS

This is a continuation of International Application No. PCT/JP2012/072942 filed on Sep. 7, 2012, and claims priority from Japanese Patent Application No. 2011-213129 filed on Sep. 28, 2011, the entire disclosures of which are incorporated herein by reference.

TECHNICAL FIELD

The invention relates to an imaging device that performs a phase difference AF and a focusing control method thereof.

BACKGROUND ART

In recent years, as a solid-state image-capture element such as a CCD (Charge Coupled Device) image sensor, a CMOS (Complementary Metal Oxide Semiconductor) image sensor and the like has been made to have a high resolution, demands for an information device having an imaging function such as a digital still camera, a digital video camera, a mobile phone, a PDA (Personal Digital Assistant) and the like sharply increase. In the meantime, the information device having the image-capture function is referred as an imaging device.

Incidentally, regarding a focusing control method of detecting a distance to a main subject and focusing on the subject, there are a contrast AF method and a phase difference AF (Auto Focus). Since the phase difference AF method can detect a focus position at higher speed and with higher precision, compared to the contrast AF method, it is adopted in various imaging devices.

In the meantime, regarding a method of reading out a signal when imaging a video in an imaging device using the COMS image sensor, a rolling shutter method has been known in which a reset and a readout are sequentially performed from an upper of pixel lines of the CMOS image sensor. In the rolling shutter method, a time difference occurs every pixel line as regards readout timing. For this reason, it has been known that an image of a moving subject is distorted.

Therefore, upon the image-capture of a moving subject with the imaging device using the CMOS image sensor, when a focusing is controlled by the phase difference AF method, an error may be caused in phase difference detection by an image movement or image change occurring while the readout timing deviates, which results from an influence of the distortion caused due to the rolling shutter.

Patent Document 1 discloses a device that, when a focus detection result having reliability is not obtained by focus detection pixels arranged in a horizontal direction, performs focus detection by focus detection pixels arranged in a vertical direction, and when movement of a subject is detected, does not perform the focus detection by the focus detection pixels arranged in the vertical direction.

Also, Patent Documents 2 and 3 disclose a device performing control so that charge accumulation timing of pixels for phase difference detection is the same.

Patent Document 1: Japanese Patent Application Publication No. 2009-128579A
Patent Document 2: Japanese Patent Application Publication No. 2008-72470A
Patent Document 3: Japanese Patent Application Publication No. 2008-263352A However, according to the technology disclosed in Patent Document 1, it is not possible to prevent false detection of the phase difference caused due to the rolling shutter. Also, according to the technologies disclosed in Patent Documents 2 and 3, since an additional circuit is required, the cost is increased.

The invention has been made keeping in mind the above situations, and an object of the invention is to provide an imaging device and a focusing control method thereof capable of detecting a phase difference with high precision and performing focusing control with high precision by reducing an influence of distortion caused due to a rolling shutter, without an additional circuit.

SUMMARY

An imaging device of the invention includes a solid-state image-capture element comprising a first line on which first phase difference detection pixels, each of which receiving one of a pair of light bundles passing through aperture areas of an imaging optical system located at different positions, are arranged in a phase difference detection direction and a second line on which second phase difference detection pixels, each of which receiving the other of the pair of light bundles, are arranged in the phase difference detection direction, the first line and the two second lines being alternately arranged in a direction orthogonal to the phase difference detection direction; an image-capture element driving unit that reads out a signal from the solid-state image-capture element by a rolling shutter method; a phase difference information calculation unit that calculates a first phase difference amount between a first signal group, which is read out from the first phase difference detection pixels of the first line, and a second signal group, which is read out from the second phase difference detection pixels on the second line from which signals are read out later than the first line and which is parallel with a rear stage of the first line and a second phase difference amount between the second signal group and a third signal group, which is read out from the first phase difference detection pixels on the first line from which signals are read out later than the second line and which is parallel with a rear stage of the second line by using the first signal group, the second signal group and the third signal group and calculates phase difference information by a calculation using the first phase difference amount and the second phase difference amount, and a focusing control unit that controls a focus of the imaging optical system on the basis of the phase difference information calculated by the phase difference information calculation unit.

A focusing control method of the invention is a focusing control method in an imaging device comprising a solid-state image-capture element that comprises a first line on which first phase difference detection pixels, each of which receiving one of a pair of light bundles passing through aperture areas of an imaging optical system located at different positions, are arranged in a phase difference detection direction and a second line on which second phase difference detection pixels, each of which receiving the other of the pair of light bundles, are arranged in the phase difference detection direction, the first line and the two second lines being alternately arranged in a direction orthogonal to the phase difference detection direction. The focusing control method includes steps of reading out a signal from the solid-state image-capture element by a rolling shutter method; calculating a first phase difference amount between a first signal group, which is read out from the first phase difference detection pixels of the first line, and a second signal group, which is read out from the second phase difference detection pixels on the second line from which signals are read out later than the first line and which is parallel with a rear stage of the first line and a second phase difference amount between the second signal group and a third signal group, which is read out from the first phase difference detection pixels on the first line from which signals are read out later than the second line and which is parallel with a rear stage of the second line by using the first signal group, the second signal group and the third signal group and calculating phase difference information by a calculation using the first phase difference amount and the second phase difference amount, and controlling a focus of the imaging optical system on the basis of the calculated phase difference information.

According to the invention, it is possible to detect the phase difference with high precision and to perform the focusing control with high precision by reducing the influence of the distortion caused due to the rolling shutter, without an additional circuit.

DETAILED DESCRIPTION

Hereinafter, illustrative embodiments of the invention will be described with reference to the drawings.

Figure 1:
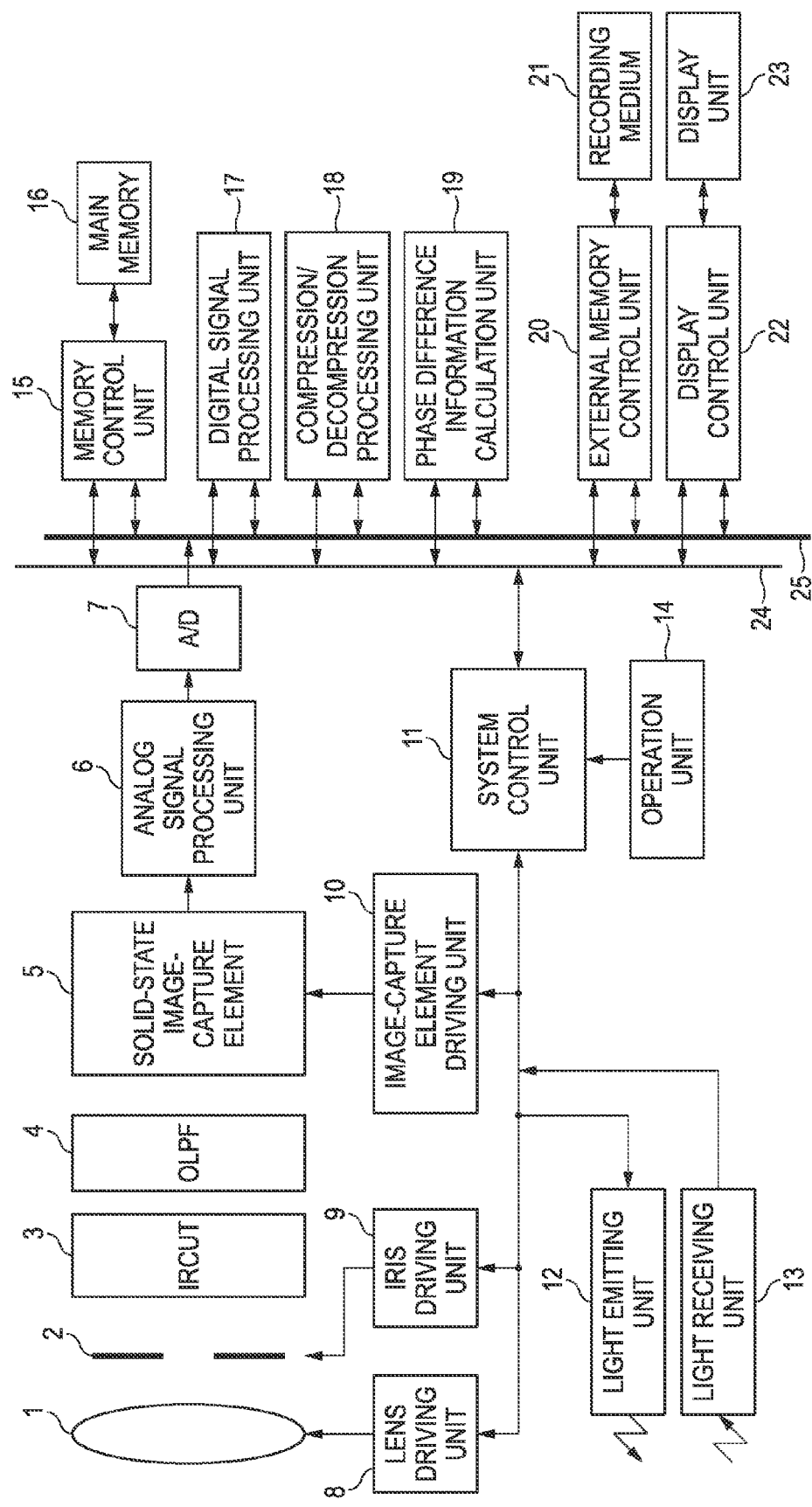
FIG. 1 shows a schematic configuration of a digital camera that is an imaging device for illustrating an illustrative embodiment of the invention.

FIG. 1 shows a schematic configuration of a digital camera that is an example of an imaging device for illustrating an illustrative embodiment of the invention.

An image-capture system of the shown digital camera has an imaging lens 1 that is an imaging optical system, a MOS-type solid-state image-capture element 5, an iris 2 provided between the lens and the image-capture element, an infrared cutoff filter 3 and an optical low-pass filter 4. The solid-state image-capture element 5 has a plurality of pixel lines on which a plurality of pixels is arranged in a horizontal direction, and is driven by a rolling shutter method of controlling signal readout timing every pixel line, as described below.

A system control unit 11 that integrally controls an entire electric control system of the digital camera controls a flash light emitting unit 12 and a light receiving unit 13. Also, the system control unit 11 controls a lens driving unit 8 to thus adjust a position of a focus lens included in the imaging lens 1 or a position of a zoon lens included in the imaging lens 1.

Also, the system control unit 11 controls an opening amount of the iris 2 through an iris driving unit 9 to thereby adjust an exposure amount.

Also, the system control unit 11 drives the solid-state image-capture element 5 through an image-capture element driving unit 10 and outputs a subject image captured through the imaging lens 1, as a captured image signal. The system control unit 11 is input with an instruction signal of a user through an operation unit 14.

The electric control system of the digital camera further has an analog signal processing unit 6 that is connected to the output of the solid-state image-capture element 5 and performs analog signal processing such as correlated double sampling processing and an A/D conversion circuit 7 that converts color signals of RGB output from the analog signal processing unit 6 into digital signals. The analog signal processing unit 6 and the A/D conversion circuit 7 are controlled by the system control unit 11.

Also, the electric control system of the digital camera has a main memory 16, a memory control unit 15 that is connected to the main memory 16, a digital signal processing unit 17 that performs an interpolation calculation, a gamma correction calculation, an RGB/YC conversion processing and the like to thereby generate captured image data, a compression/decompression processing unit 18 that compresses the captured image data generated in the digital signal processing unit 17 into a JPEG format or decompresses the compressed image data, a phase difference information calculation unit 19 that calculates phase difference information by using image-capture signals read out from phase difference detection pixels included in the solid-state image-capture element 5, an external memory control unit 20 to which a detachable recording medium 21 is connected and a display control unit 22 to which a display unit 23 mounted to a backside of the camera is connected. The memory control unit 15, the digital signal processing unit 17, the compression/decompression processing unit 18, the phase difference information processing unit 19, the external memory control unit 20 and the display control unit 22 are connected to each other by a control bus 24 and a data bus 25 and are controlled by commands issued from the system control unit 11.

Figure 2:
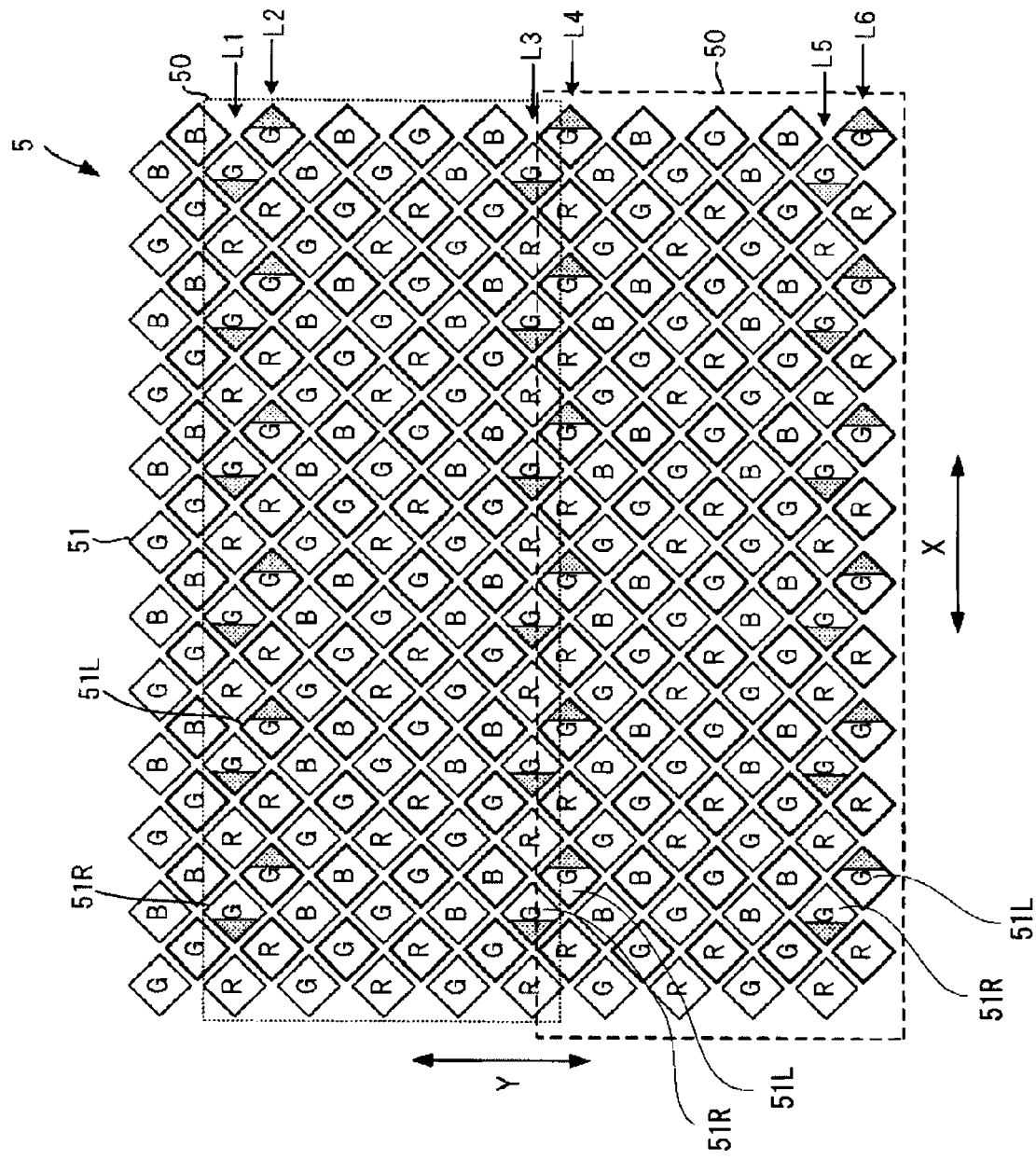
FIG. 2 is a plan pictorial view showing a schematic configuration of a solid-state image-capture element 5 that is mounted on the digital camera shown in FIG. 1.

FIG. 2 is a plan pictorial view showing a schematic configuration of the solid-state image-capture element 5 that is mounted on the digital camera shown in FIG. 1.

The solid-state image-capture element 5 has a plurality of pixels that is arranged in a two-dimensional shape in a row direction X and a column direction Y intersecting with the row direction. In the example of FIG. 2, the pixels are arranged in a so-called honeycomb shape in which an odd line and an even line of lines, each of which consists of a plurality of pixels lined up at a predetermined pitch in the row direction X, are deviated in the row direction X by a half of the pixel arrangement pitch on each line in the row direction X. Meanwhile, in FIG. 2, in order to easily distinguish the odd and even lines of the pixel lines, the pixels on the even line are shown with a bold line.

The pixels include an image-capture pixel 51, a phase difference detection pixels 51L and a phase difference detection pixel 51R.

The image-capture pixel 51 is a pixel that receives both of a pair of light bundles passing through aperture areas of the imaging lens 1 located at different positions (light bundles passing through the left and the right on the basis of a main axis of the imaging lens 1).

The phase difference detection pixel 51R is a pixel that receives one of the pair of light bundles passing through aperture areas of the imaging lens 1 located at different positions (the light bundle passing through one side (here, the right side) on the basis of the main axis of the imaging lens 1). In comparison to the image-capture pixel 51, a left end portion of an opening of a photoelectric conversion unit of the phase difference detection pixel 51R is light-shielded, so that an opening area of the photoelectric conversion unit is smaller. In FIG. 2, a hatched area of the phase difference detection pixel 51R is light-shielded and the opening of the photoelectric conversion unit of the phase difference detection pixel 51R is made to be eccentric rightwards.

The phase difference detection pixel 51L is a pixel that receives the other of the pair of light bundles passing through aperture areas of the imaging lens 1 located at different positions (the light bundle passing through the other side (here, the left side) on the basis of the main axis of the imaging lens 1). In comparison to the image-capture pixel 51, a right end portion of an opening of a photoelectric conversion unit of the phase difference detection pixel 51L is light-shielded, so that an opening area of the photoelectric conversion unit is smaller. In FIG. 2, a hatched area of the phase difference detection pixel 51L is light-shielded and the opening of the photoelectric conversion unit of the phase difference detection pixel 51L is made to be eccentric leftwards.

Color filters are formed above the photoelectric conversion units of the respective pixels on the odd lines of the pixels included in the solid-state image-capture element 5, and arrangement of the color filters is Bayer arrangement.

Also, color filters are formed above the photoelectric conversion units of the respective pixels on the even lines of the pixels included in the solid-state image-capture element 5, and arrangement of the color filters is also Bayer arrangement.

In FIG. 2, the pixel having a color filter (hereinafter, referred to as R filter) enabling red (R) light to pass therethrough is denoted with "R". Also, the pixel having a color filter (hereinafter, referred to as G filter) enabling green (G) light to pass therethrough is denoted with "G". Also, the pixel having a color filter (hereinafter, referred to as B filter) enabling blue (B) light to pass therethrough is denoted with "B".

By the above color filter arrangement, the pixel on the even line detecting the same color light as each pixel on the odd line is arranged at an oblique right-lower side with respect to each pixel on the odd line. By this configuration, an image captured on the odd line and an image captured on the even line are synthesized to improve the sensitivity and to change exposure time between the odd line and the even line and an image captured on the odd line and an image captured on the even line are synthesized to enlarge a dynamic range.

The lines of the pixels of the solid-state image-capture element 5 includes a first line on which the phase difference detection pixels 51R are arranged at an equal interval in the row direction X with the image-capture pixel 51 being interposed therebetween and a second line on which the phase difference detection pixels 51L are arranged in the row direction X at the same equal interval as the phase difference detection pixels 51L. The first line and the second line are alternately arranged in the column direction Y.

In the example of FIG. 2, the three first lines and the three second lines are included in the shown area of the solid-state image-capture element 5. In FIG. 2, a line L1 of a third stage from the top, a line L3 of an eleventh stage from the top arranged at the rear end of the line L1 and a line L5 of a second stage from the bottom, on each of which a G filter-mounted pixel is the phase difference detection pixel 51R, are the first lines, respectively.

Also, in FIG. 2, a line L2 arranged at the rear stage of the line L1 by one stage, a line L4 arranged at the rear end of the line L3 by one end and a line L6 arranged at the rear end of the line L5 by one end, on each of which a G filter-mounted pixel is the phase difference detection pixel 51L, are the second lines, respectively.

An area in which the lines L1, L2, L3 are arranged and an area in which the lines L4, L5, L6 are arranged are respectively phase difference detection areas 50 becoming targets for which the phase difference information is calculated.

From the solid-state image-capture element 5 configured as described above, an image-capture signal is read out by a rolling shutter method. That is, exposure is sequentially made from the upper line of FIG. 2 towards the lower line, i.e., from a front stage line towards a rear stage line, so that an image-capture signal is read out from the solid-state image-capture element 5 in order from a line for which the exposure is over.

Subsequently, phase difference information calculation processing that is executed by the phase difference information calculation unit 19 of the digital camera shown in FIG. 1 is described.

Figure 3:
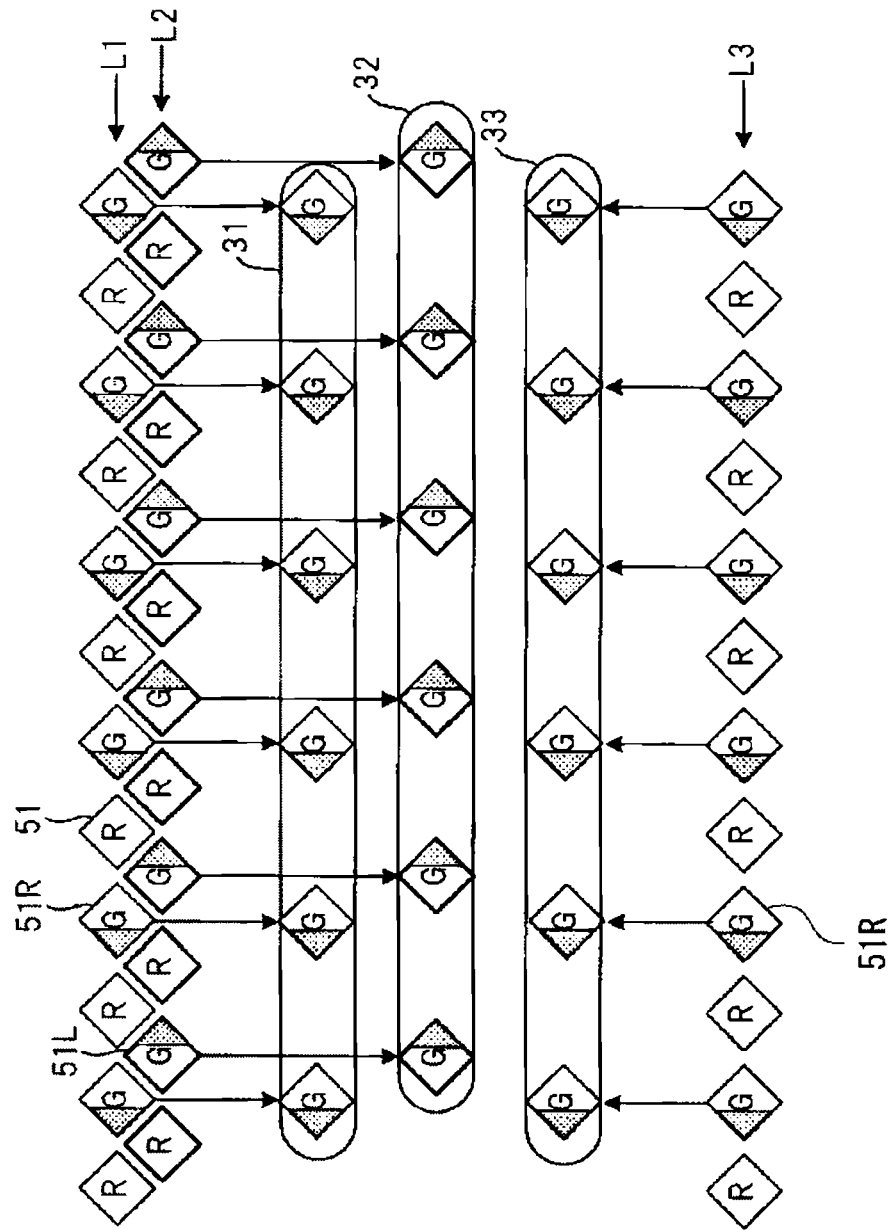
FIG. 3 illustrates phase difference information calculation processing that is performed by a phase difference information calculation unit 19.

FIG. 3 is a view for illustrating the phase difference information calculation processing that is executed by the phase difference information calculation unit 19. FIG. 3 shows the lines L1, L2, L3 in the phase difference detection area 50 shown in FIG. 2.

The phase difference information calculation unit 19 performs a correlation calculation between a signal group 31, which is a signal group read out from each phase difference detection pixel 51R on the line L1 shown in FIG. 3, and a signal group 32, which is a signal group read out from each phase difference detection pixel 51L on the line L2 shown in FIG. 3, by a well-known method and thus calculates a phase difference amount (a first phase difference amount) between the signal group 31 and the signal group 32. The first phase difference amount is a phase difference amount in the row direction X of a waveform of the signal 32 on the basis of a waveform (a waveform that is obtained by plotting positions of the pixels of output sources of the respective signals configuring the signal group in the row direction X on a horizontal axis and plotting signal output levels of the respective pixels on a vertical axis) of the signal group 31.

Also, the phase difference information calculation unit 19 performs a correlation calculation between the signal group 32 and a signal group 33, which is a signal group read out from each phase difference detection pixel 51R on the line L3 shown in FIG. 3, and thus calculates a phase difference amount (a second phase difference amount) between the signal group 32 and the signal group 33. The second phase difference amount is a phase difference amount in the row direction X of a waveform of the signal 33 on the basis of the waveform of the signal group 32.

Signal readout timing deviates between the line L1 and the line L2. When imaging a subject moving at high speed, a distortion is caused in a subject image due to the deviation of the signal readout timing. For this reason, the first phase difference amount includes an influence of the distortion in the subject image caused due to the rolling shutter method.

Also, signal readout timing deviates between the line L2 and the line L3. When imaging a subject moving at high speed, a distortion is caused in a subject image due to the deviation of the signal readout timing. For this reason, the second phase difference amount includes an influence (distortion component) of the distortion in the subject image caused due to the rolling shutter method.

That is, the first phase difference amount and the second phase difference amount are expressed as follows.

(First Phase Difference Amount) =

$$\begin{pmatrix} \text{Phase Difference Amount } A1 \text{ between Signal Group 31} \\ \text{and Signal Group 32} \end{pmatrix} +$$

$$\begin{pmatrix} \text{Distortion Influence Amount } A2 \text{ between Line } L1 \text{ and Line } L2 \\ \text{Due to Rolling Shutter} \end{pmatrix}$$

(Second Phase Difference Amount) =

$$\begin{pmatrix} \text{Phase Difference Amount } B1 \text{ between Signal Group 32} \\ \text{and Signal Group 33} \end{pmatrix} +$$

$$\begin{pmatrix} \text{Distortion Influence Amount } B2 \text{ between Line } L2 \\ \text{and Line } L3 \text{ Due to Rolling Shutter} \end{pmatrix}$$

Here, the phase difference amount A1 and the phase difference amount B1 have the same magnitude. However, since deviation directions thereof are different, signs thereof are opposite to each other.

The line L1 and the line L2 shown in FIG. 2 are lines adjacent to each other. Therefore, the distortion influence amount A2 in the above equation is an amount corresponding to one line.

In contrast, as shown in FIG. 2, there are six lines between the line L2 and the line L3. That is, the signal readouts of seven lines are performed from the signal readout completion of the line L2 to the signal readout completion of the line L3. Therefore, the distortion influence amount B2 in the above equation is an amount corresponding to seven lines. Hence, a following equation is established.

(Distortion Influence Amount $B2$)=(Distortion Influence Amount $A2$)×7

When the phase difference amount A1 is denoted with a plus sign and the phase difference amount B1 is denoted with a minus sign, the phase difference information calculation unit 19 performs a calculation of cancelling the distortion influence amount, as described below, to thus calculate phase difference information D corresponding to the phase difference detection area 50 in which the lines L1, L2, L3 are arranged. As can be seen from a following equation, the phase difference information D little includes the influence amount caused due to the rolling shutter.

(Phase Difference Information $D$) =

$$\left\{ \begin{matrix} (\text{First Phase Difference Amount}) \times 7 - \\ (\text{Second Phase Difference Amount}) \end{matrix} \right\} =$$

$$\left[ \begin{matrix} \left\{ \begin{matrix} (\text{Phase Difference Amount } A1) \times 7 + \\ (\text{Distortion Influence Amount } A2) \times 7 \end{matrix} \right\} - \\ \begin{pmatrix} \text{Phase Difference Amount } B1 + \\ \text{Distortion Influence Amount } B2 \end{pmatrix} \end{matrix} \right] =$$

$$\left\{ \begin{matrix} (\text{Phase Difference Amount } A1) \times 7 - \\ (\text{Phase Difference Amount } B1) \end{matrix} \right\}$$

In the meantime, the phase difference information D includes the more phase difference amount as an amount multiplied by a factor 7. However, upon post-processing, the phase difference information is preferably divided by the factor. Also, the phase difference information D may be also obtained by a calculation of {(the first phase difference amount)−(the second phase difference amount)×1/7}.

That is, the number of lines consisting of only the image-capture pixels 51 between the line L1 and the line L2 is denoted with N1 (zero (0) in the example of FIG. 2) and the number of lines consisting of only the image-capture pixels 51 between the line L2 and the line L3 is denoted with N2 (six (6) in the example of FIG. 2). The phase difference information calculation unit 19 multiplies at least one of the first phase difference amount and the second phase difference amount by a factor enabling the distortion influence amount (the distortion influence amount A2) of the (N1+1) lines included in the first phase difference amount on the phase difference information, which is caused due to the rolling shutter method, and the distortion influence amount (the distortion influence amount B2) of the (N2+1) lines included in the second phase difference amount on the phase difference information, which is caused due to the rolling shutter method, to be the same. Then, the phase difference information calculation unit 19 performs a calculation of subtracting the second phase difference amount from the first phase difference amount to thereby calculate the phase difference information D.

Also, the phase difference information calculation unit 19 performs a correlation calculation between a signal group, which is read out from each phase difference detection pixel 51L on the line L4 shown in FIG. 3, and a signal group, which is read out from each phase difference detection pixel 51R on the line L5 shown in FIG. 3, and thus calculates a third phase difference amount.

Also, the phase difference information calculation unit 19 performs a correlation calculation between the signal group, which is read out from each phase difference detection pixel 51R on the line L5 shown in FIG. 3, and a signal group, which is read out from each phase difference detection pixel 51L on the line L6 shown in FIG. 3, and thus calculates a fourth phase difference amount.

The phase difference information calculation unit 19 cancels the distortion influence amounts included in the respective phase difference amounts by performing a calculation of {(Fourth Phase Difference Amount)×7−(Third Phase Difference Amount)}, thereby calculating the phase difference information corresponding to the phase difference detection area 50 in which the lines L4, L5, L6 are arranged.

Finally, the phase difference information calculation unit 19 calculates an average of the phase difference information corresponding to the phase difference detection area 50 in which the lines L1, L2, L3 are arranged and the phase difference information corresponding to the phase difference detection area 50 in which the lines L4, L5, L6 are arranged, as final phase difference information, and transmits the phase difference information to the system control unit 11.

The system control unit 11 calculates a distance to the subject, based on the phase difference information received from the phase difference information calculation unit 19. Then, the system control unit 11 drives the imaging lens 1 through the lens driving unit 8, based on the distance, to thus control a position of the focus lens, thereby focusing on the subject.

In this way, according to the digital camera shown in FIG. 1, it is possible to prevent the calculation precision of the phase difference information from being lowered, which is caused due to the rolling shutter method.

Meanwhile, in FIG. 2, when at least one the phase difference detection area 50 is provided, it is possible to calculate the phase difference information, which is used for the focusing control, by the phase difference information calculation unit 19.

Figure 4:
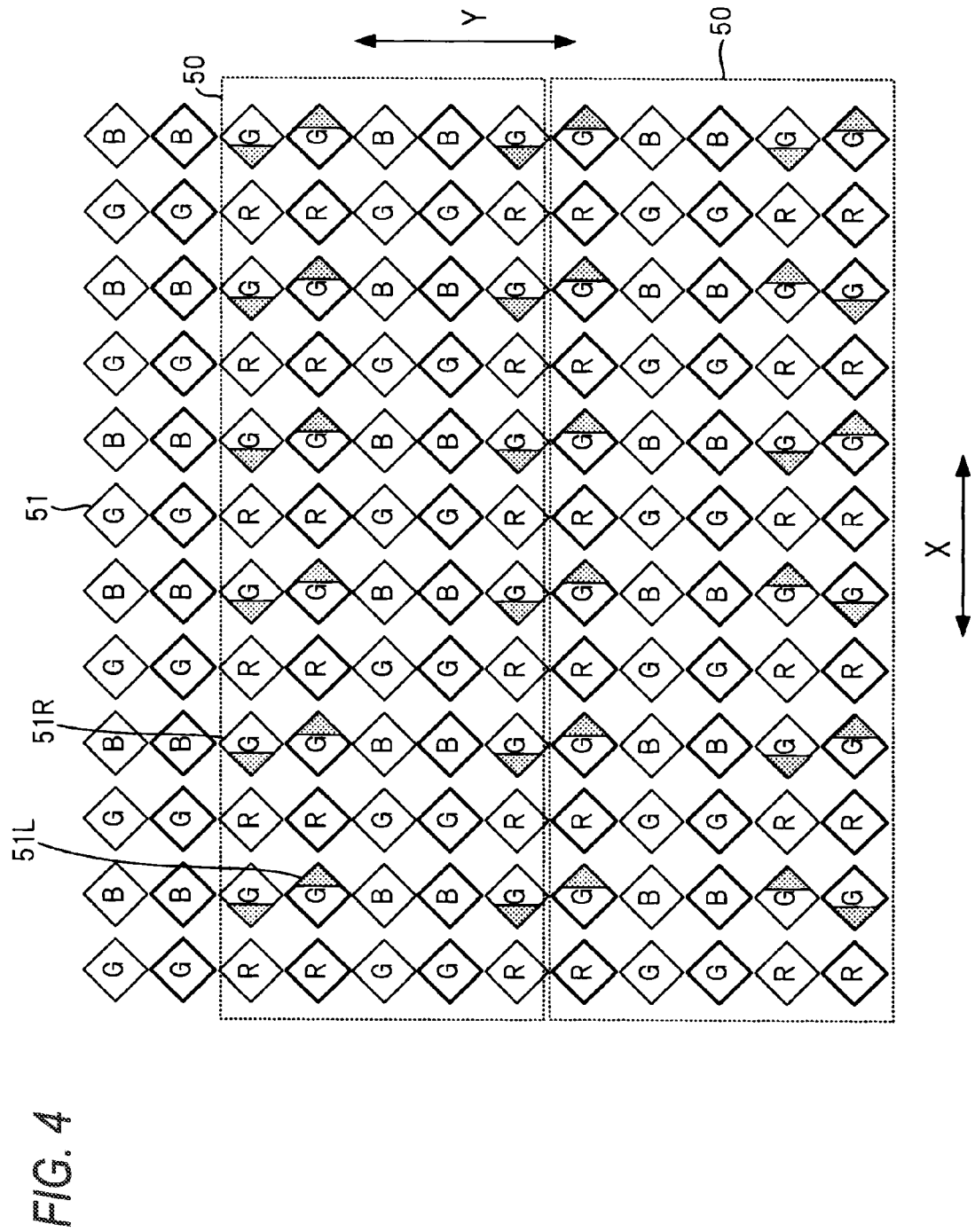
FIG. 4 shows a modified embodiment of the solid-state image-capture element 5 shown in FIG. 2.

Also, in the example of FIG. 2, the odd line and even line of the pixels are deviated in the row direction X. However, the invention is not limited thereto. For example, as shown in FIG. 4, the even line shown in FIG. 2 may be deviated leftwards by a half of the pixel arrangement pitch on each line.

Also, in addition to the phase difference information calculation processing shown in FIG. 3, the phase difference information calculation unit 19 may perform first simplifying processing of calculating the phase difference amount, which is obtained by performing the correlation calculation between the signal group, which is read out from the phase difference detection pixels 51R on the line L1, and the signal group, which is read out from the phase difference detection pixels 51L on the line L2, as the phase difference information corresponding to the phase difference detection area 50 in which the lines L1, L2, L3 are arranged and second simplifying processing of calculating the phase difference amount, which is obtained by performing the correlation calculation between the signal group, which is read out from the phase difference detection pixels 51L on the line L2, and the signal group, which is read out from the phase difference detection pixels 51R on the line L3, as the phase difference information corresponding to the phase difference detection area 50 in which the lines L1, L2, L3 are arranged.

In the simplifying processing, it is not possible to reduce the influence of the rolling shutter. However, it is possible to reduce a calculation amount necessary to calculate the phase difference information. In particular, in the first simplifying processing, it is possible to obtain the phase difference information in which the influence of the rolling shutter is less than in the second simplifying processing.

Thus, preferably, when it is presumed that the distortion influence of the rolling shutter is large, the phase difference information calculation unit 19 calculates the phase difference information corresponding to each phase difference detection area 50 by the processing shown in FIG. 3 and when it is presumed that the distortion influence of the rolling shutter is small, the phase difference information calculation unit calculates the phase difference information corresponding to each phase difference detection area 50 by any one of the first simplifying processing and the second simplifying processing.

For example, when an AF area has a size of a predetermined threshold or larger, the phase difference information calculation unit 19 presumes that the distortion influence of the rolling shutter is large and when an AF area is smaller than the threshold, the phase difference information calculation unit presumes that the distortion influence of the rolling shutter is small. Here, the AF area is a focusing area and may be configured so that the digital camera of FIG. 1 can arbitrarily set a position or size thereof by a user of the camera or so that a size of the AF area is set depending on an image-capture mode. When the AF area is not so large, the number of phase difference detection areas included in the AF area is small. As a result, the number of phase difference detection pixels, from which the signals are read out so as to detect the phase difference information, is also small. For this reason, it is considered that the distortion influence of the rolling shutter is small.

Also, it is thought that the influence of the rolling shutter is larger as a subject distance in an imaging field angle becomes longer. Hence, when the subject distance is a threshold or larger, the phase difference information calculation unit 19 may presume that distortion influence of the rolling shutter is large, and when the subject distance is shorter than the threshold, the phase difference information calculation unit may presume that distortion influence of the rolling shutter is small.

Also, the distortion due to the rolling shutter occurs when there is a moving object in the imaging field angle. Hence, when a moving object is detected in the AF area and there is a moving object in the AF area, the phase difference information calculation unit 19 may presume that distortion influence of the rolling shutter is large, and when there is no moving object in the AF area, the phase difference information calculation unit may presume that distortion influence of the rolling shutter is small.

In this way, the distortion influence of the rolling shutter is presumed on the basis of at least one of the imaging condition such as the size of the AF area and the like and the subject condition such as the subject distance, the movement of the subject and the like. As a result, when it is presumed that the distortion influence of the rolling shutter is small, the system control unit 11 performs the focusing control based on the phase difference information obtained in the processing of FIG. 3. When it is presumed that the distortion influence of the rolling shutter is large, the system control unit 11 performs the focusing control based on the phase difference information obtained in the above-described simplifying processing. Thereby, it is possible to improve the phase difference detection precision and to reduce the power consumption by the reduction of the calculation amount.

In the meantime, when it is presumed that the distortion influence of the rolling shutter is small, the first simplifying processing or the second simplifying processing may be selected as follows. That is, the phase difference information calculation unit 19 determines the first or second simplifying processing, depending on the number N1 of lines consisting of only the image-capture pixels 51 between the two lines becoming the calculation sources of the phase difference information to be calculated by the first simplifying processing and the number N2 of lines consisting of only the image-capture pixels 51 between the two lines becoming the calculation sources of the phase difference information to be calculated by the second simplifying processing.

For example, when N1≤N2, like the configuration shown in FIG. 2, the phase difference information calculation unit 19 executes the first simplifying processing. Meanwhile, in FIG. 2, when there are seven lines between the line L1 and the line L2 and N1>N2, the phase difference information calculation unit 19 executes the second simplifying processing. By doing so, it is possible to obtain the phase difference information with higher precision.

Figure 5:
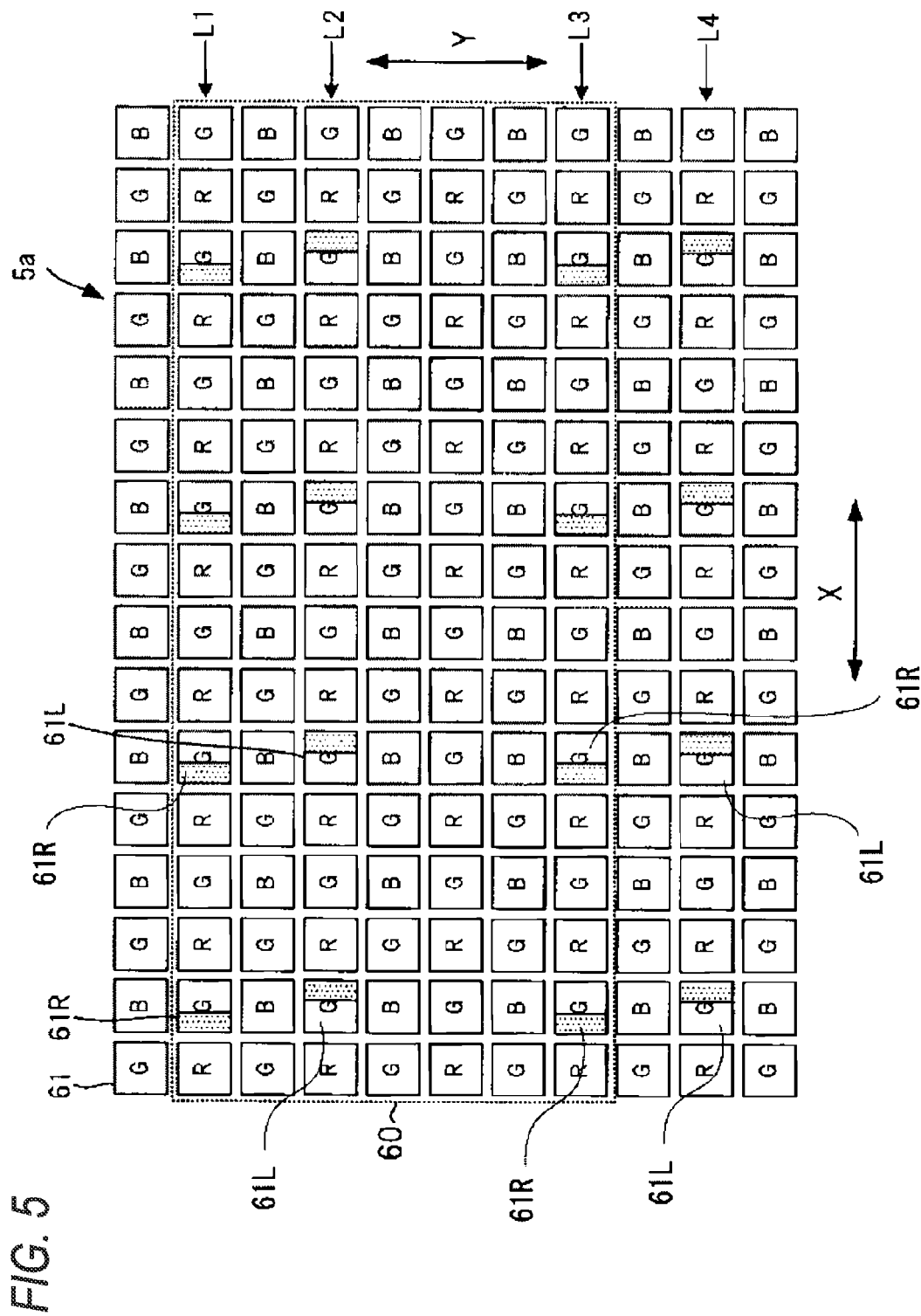
FIG. 5 is a plan pictorial view of a solid-state image-capture element 5a that is a modified embodiment of the solid-state image-capture element 5 shown in FIG. 2.

FIG. 5 is a plan pictorial view of a solid-state image-capture element 5a that is a modified embodiment of the solid-state image-capture element 5 shown in FIG. 2.

The solid-state image-capture element 5a has a plurality of pixels (each of which has a square shape in FIG. 5) arranged in a square lattice shape in the row direction X and in the column direction Y. The basic configuration of the pixels is the same as each pixel of the solid-state image-capture element 5 shown in FIG. 2.

Color filters are formed above the photoelectric conversion units of the respective pixels and arrangement of the color filters is Bayer arrangement in the entire pixels. In FIG. 5, the letters "R, G, B" denoted in the respective pixels indicate colors of the color filters mounted on the pixels.

The pixels include an image-capture pixel 61 having the same configuration as the image-capture pixel 51 of FIG. 2, a phase difference detection pixel 61L having the same configuration as the phase difference detection pixel 51L of FIG. 2 and a phase difference detection pixel 61R having the same configuration as the phase difference detection pixel 51R of FIG. 2.

The phase difference detection pixels 61R are arranged every three pixels at positions of the G filter-mounted pixels on the line L1 of a second stage from the top of FIG. 5.

Also, the phase difference detection pixels 61L are arranged every three pixels at positions of the G filter-mounted pixels on the line L2 of a fourth stage from the top of FIG. 5.

Also, the phase difference detection pixels 61R are arranged every three pixels at positions of the G filter-mounted pixels on the line L3 of an eighth stage from the top of FIG. 5.

Also, the phase difference detection pixels 61L are arranged every three pixels at positions of the G filter-mounted pixels on the line L4 of a tenth stage from the top of FIG. 5.

In this way, the solid-state image-capture element 5a is configured so that the line on which the phase difference detection pixels 61R are arranged and the line on which the phase difference detection pixels 61L are arranged are alternately arranged in the column direction Y. In the meantime, the phase difference detection pixels 61L on the line L4 of FIG. 5 may be changed into the image-capture pixels 61.

Also in the solid-state image-capture element 5a configured as described above, the phase difference information calculation unit 19 performs the processing described in FIG. 3 for a phase difference detection area 60 in which the lines L1, L2, L3 are arranged to thus calculate the phase difference information, so that it is possible to calculate the phase difference information of the high precision in which the influence of the rolling shutter is reduced.

For example, when a correlation calculation result between a signal group, which is read out from the phase difference detection pixels 61R on the line L1, and a signal group, which is read out from the phase difference detection pixels 61L on the line L2, is denoted with C1 and a correlation calculation result between the signal group, which is read out from the phase difference detection pixels 61L on the line L2, and a signal group, which is read out from the phase difference detection pixels 61R on the line L3, is denoted with C2, C1 and C2 are as follows.

$C1$=(Phase Difference Amount between Line $L1$ and Line $L2$)+(Distortion Influence Amount Corresponding to Two Lines)

$C2$=(Phase Difference Amount between Line $L2$ and Line $L3$)+(Distortion Influence Amount Corresponding to Four Lines)

For this reason, when the phase difference amount between the line L1 and the line L2 is denoted with a plus sign and the phase difference amount between the line L2 and the line L3 is denoted with a minus sign, the phase difference information calculation unit 19 performs a following calculation to thus calculate the phase difference information, thereby calculating the phase difference information in which the influence of the rolling shutter is reduced.

Phase Difference Information=$(C1 \times 2 - C2)$

Figure 6:
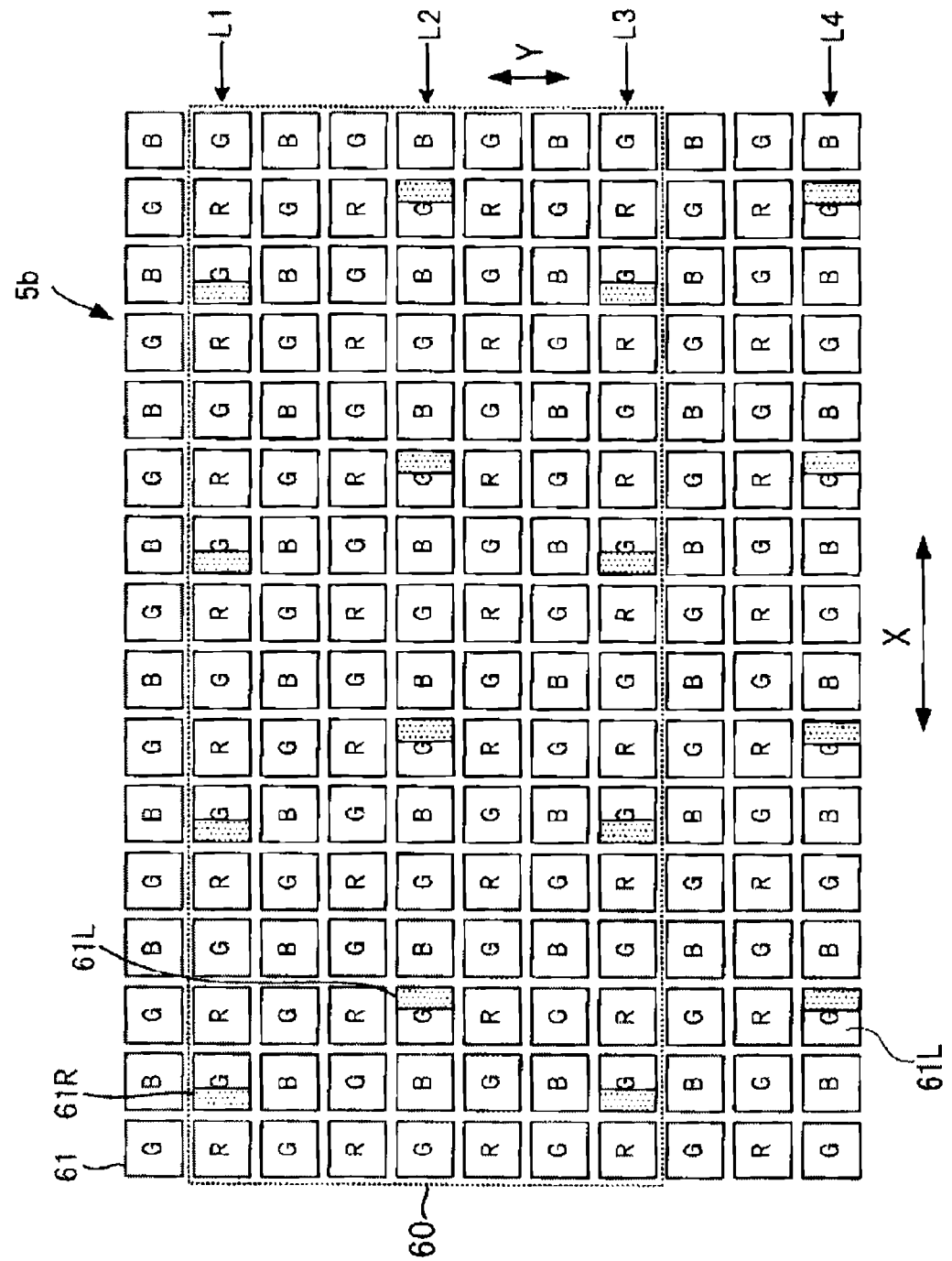
FIG. 6 is a plan pictorial view of a solid-state image-capture element 5b that is a modified embodiment of the solid-state image-capture element 5a shown in FIG. 5.

FIG. 6 is a plan pictorial view of a solid-state image-capture element 5b that is a modified embodiment of the solid-state image-capture element 5a shown in FIG. 5. The solid-state image-capture element 5b has the same configuration as shown in FIG. 5, except that the positions of the phase difference detection pixels 61L on the lines L2, L4 shown in FIG. 5 are changed to the positions of the G filter-mounted pixels located at the right-lower side thereof. Like this, even when the column position of each phase difference detection pixel on the line L1 and the column position of each phase difference detection pixel on the line L2 deviate from each other, it is possible to obtain the same effects as the solid-state image-capture element 5a shown in FIG. 5.

Figure 7:
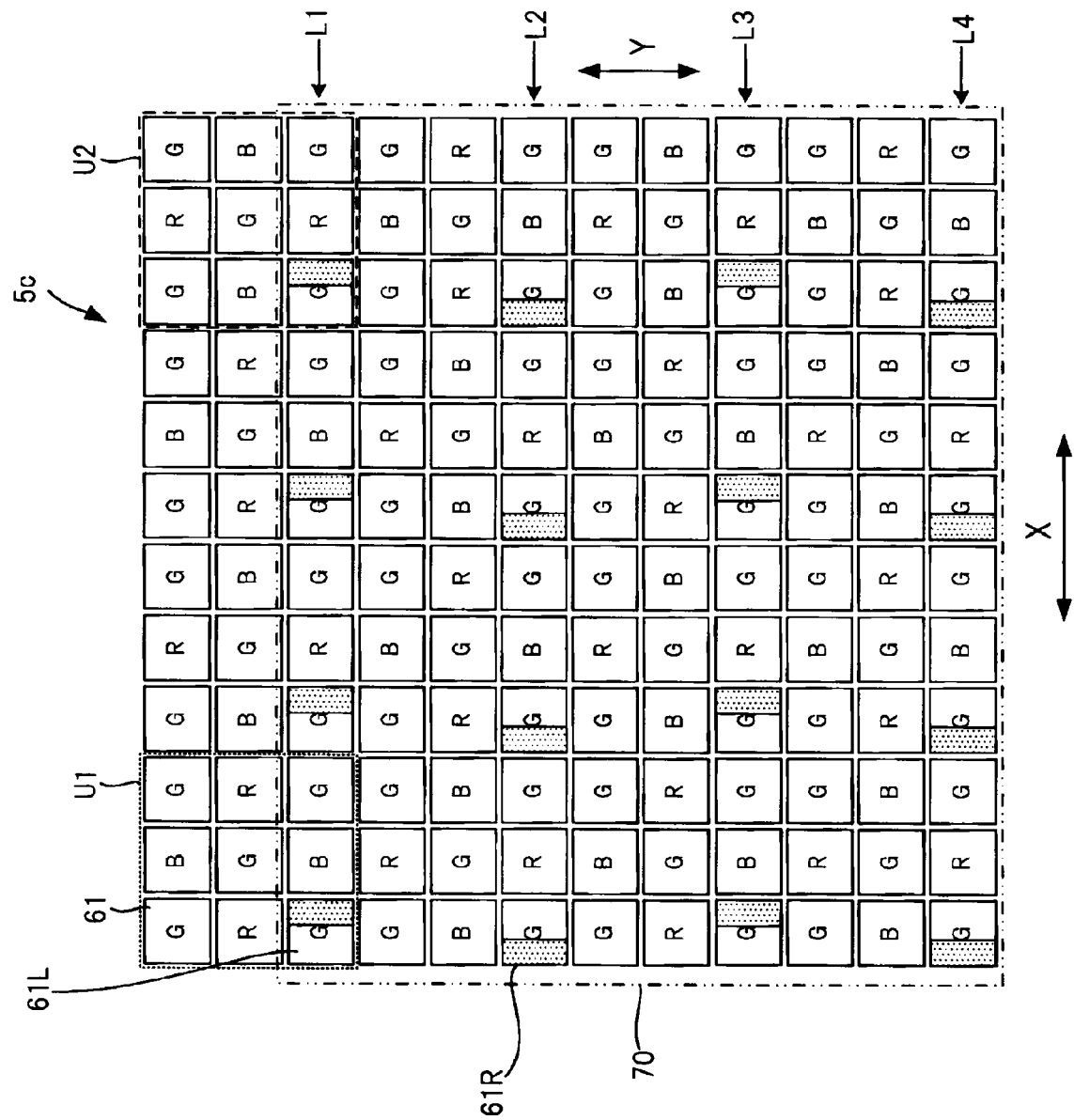
FIG. 7 is a plan pictorial view of a solid-state image-capture element 5c that is a modified embodiment of the solid-state image-capture element 5 mounted on the digital camera shown in FIG. 1.

FIG. 7 is a plan pictorial view of a solid-state image-capture element 5c that is a modified embodiment of the solid-state image-capture element 5 mounted on the digital camera shown in FIG. 1. In the solid-state image-capture element 5c, the arrangement of the color filters mounted on the respective pixels of the solid-state image-capture element 5a shown in FIG. 5 is changed. The color filters mounted in the solid-state image-capture element 5c are arranged so that a ratio of the number of R filters, the number of B filters and the number of G filters is 1:1:2.5.

Specifically, the color filters mounted in the solid-state image-capture element 5c are arranged so that a filter arrangement in a unit U1 shown in FIG. 7 and a filter arrangement in a unit U2, in which positions of an R filter and a B filter of the filter arrangement in the unit U1 are changed, are arranged in a checker board shape.

In other words, the unit U1 and the unit U2 are alternately arranged in the horizontal and vertical directions.

In the unit U1, the G filters that are brightness filters are arranged at four corners and a center. Also, in the unit U1, the R filters are arranged at both sides of the central G filter in the row direction X and the B filters are arranged at both sides of the central G filter in the column direction Y.

The unit U2 is configured so that the positions of the R and B filters in the unit U1 are changed each other.

Also, the units U1, U2 are alternately arranged in the horizontal and vertical directions, so that the G filters at the four corners of the units U1, U2 include the square arrangement of the G filters of 2×2 pixels.

The color filter arrangement of the solid-state image-capture element 5c is configured so that a basic arrangement pattern, which is a filter arrangement of 6 lines×6 columns formed by alternately arranging the two units U1 and the two units U2 in the horizontal and vertical directions, is repeated.

In the color filter arrangement configured as described above, the first filters (G filters) corresponding to the first color (G), which most contributes to the acquisition of the brightness signal, are arranged in the respective lines of the horizontal, vertical and oblique directions of the color filter arrangement. Also, a ratio of the number of pixels of the first color corresponding to the first filter becomes larger than ratios of the number of pixels of the second colors (B, R) corresponding to the second filters (B filter, R filter) of the second colors (B, R) except for the first color. By this arrangement, it is possible to improve reproduction precision of simultaneous processing in a high frequency region and to suppress the aliasing.

Also, since the one or more second filters (B filter, R filter) corresponding to the second colors (B, R) are arranged in the respective lines of the horizontal and vertical directions in the basic arrangement pattern, it is possible to suppress occurrence of color moiré (false color), thereby realizing the high resolution.

Also, the color filter arrangement is configured so that the predetermined basic arrangement pattern is repeated in the horizontal and vertical directions. Thus, when performing the simultaneous (interpolation) processing after the readout of the image signal, it is possible to perform the processing in accordance with the repeating pattern and to simplify the simultaneous (interpolation) processing, compared to the conventional random arrangement.

In the solid-state image-capture element 5c having the color filters mounted thereto, parts of the G filter-mounted pixels are the phase difference detection pixels 61L, 61R.

In the example of FIG. 7, the phase difference detection pixels 61L are arranged at an equal interval at the positions of the G filter-mounted pixels on the line L1 of the third stage from the top, the phase difference detection pixels 61R are arranged at an equal interval at the positions of the G filter-mounted pixels on the line L2 of the sixth stage from the top, the phase difference detection pixels 61R are arranged at an equal interval at the positions of the G filter-mounted pixels on the line L3 of the ninth stage from the top and the phase difference detection pixels 61L are arranged at an equal interval at the positions of the G filter-mounted pixels on the line L4 of the twelfth stage from the top. In the meantime, the phase difference detection pixels 51R on the line L4 may be replaced with the image-capture pixels 61.

Like this, the solid-state image-capture element 5c is configured so that the line on which the phase difference detection pixels 61R are arranged and the line on which the phase difference detection pixels 61L are arranged are alternately arranged in the column direction Y.

Also in the solid-state image-capture element 5c configured as described above, the phase difference information calculation unit 19 performs the processing described in FIG. 3 for a phase difference detection area 70 in which the lines L1, L2, L3 are arranged to thus calculate the phase difference information, so that it is possible to calculate the phase difference information of the high precision in which the influence of the rolling shutter is reduced.

For example, when a correlation calculation result between a signal group, which is read out from the phase difference detection pixels 61L on the line L1, and a signal group, which is read out from the phase difference detection pixels 61R on the line L2, is denoted with D1 and a correlation calculation result between the signal group, which is read out from the phase difference detection pixels 61R on the line L2, and a signal group, which is read out from the phase difference detection pixels 61L on the line L3, is denoted with D2, D1 and D2 are as follows.

$D1$=(Phase Difference Amount between Line $L1$ and Line $L2$)+(Distortion Influence Amount Corresponding to Three Lines)

$D2$=(Phase Difference Amount between Line $L2$ and Line $L3$)+(Distortion Influence Amount Corresponding to Three Lines)

For this reason, when the phase difference amount between the line L1 and the line L2 is denoted with a plus sign and the phase difference amount between the line L2 and the line L3 is denoted with a minus sign, the phase difference information calculation unit 19 performs a following calculation to thus calculate the phase difference information, thereby calculating the phase difference information in which the influence of the rolling shutter is reduced.

Phase Difference Information=$(D1-D2)$

In this way, the solid-state image-capture element 5c shown in FIG. 7 also can obtain the same effects as the solid-state image-capture element 5a shown in FIG. 5.

In the meantime, also in the digital camera having the solid-state image-capture element shown in FIGS. 5 to 7 mounted thereto, the phase difference information calculation unit 19 can perform the simplifying processing of calculating any one of the correlation calculation result of the line L1 and the line L2 and the correlation calculation result of the line L2 and the line L3, as the phase difference information corresponding to the phase difference detection area including the line L1 and the line L2.

The above descriptions are based on the premise that when the system control unit 11 performs the phase difference AF, the image-capture element driving unit 10 reads out the signals from all the lines of the solid-state image-capture element. However, when performing the phase difference AF, the system control unit 11 may perform the control so that a thinning driving of reading out signals from only the line including the phase difference pixels is performed.

When performing the thinning driving, the distortion influence amount included in the correlation calculation result of the line L1 and the line L2 in the phase difference detection area and the distortion influence amount included in the correlation calculation result of the line L2 and the line L3 in the phase difference detection area are the same in any of the solid-state image-capture elements 5, 5a, 5b, 5c. For this reason, the phase difference information corresponding to the phase difference detection area can be calculated by averaging an absolute value of the correlation calculation result of the line L1 and the line L2 and an absolute value of the correlation calculation result of the line L2 and the line L1, so that the calculation can be simplified.

In the above illustrative embodiments, the color filters are mounted to the solid-state image-capture element. However, a solid-state image-capture element for monochrome image-capture to which a color filter is not mounted is also possible. Also, in the above descriptions, the G filter-mounted pixel is used as the phase difference detection pixel. However, the R filter-mounted pixel or the B filter-mounted pixel may be used as the phase difference detection pixel.

Also, in the above descriptions, the solid-state image-capture element is used for image-capture and for phase difference detection. However, a solid-state image-capture element only for phase difference detection for which an image-capture pixel is not provided is also possible. In the solid-state image-capture element only for phase difference detection, the signal is read out in the same manner as the thinning driving, so that the calculation can be simplified.

When the solid-state image-capture element is used for image-capture and for phase difference detection and has the configuration where the line consisting of only the image-capture pixels is arranged between the lines including the phase difference detection pixels (for example, the configuration shown in FIGS. 5 to 7), the influence of the rolling shutter, which is caused when the thinning driving is not performed for the solid-state image-capture element only for the phase difference detection or the solid-state image-capture element having the configuration shown in FIGS. 2 and 4, is apt to occur. For this reason, the invention is more effective for the solid-state image-capture element in which the line consisting of only the image-capture pixels is arranged between the lines including the phase difference detection pixels.

In this specification, the line consisting of only the image-capture pixels may be arranged between the lines including the phase difference detection pixels. However, when mentioning the positional relation between the lines of the phase difference detection pixels, the line consisting of only the image-capture pixels is excluded. For example, in FIG. 5, the line of the phase difference detection pixels, which is located next to the line L1 in the column direction Y (which is arranged at the rear stage of the line L1 by one stage in the column direction Y), is the line L2 and the line of the phase difference detection pixels, which is located next to the line L2 in the column direction Y (which is arranged at the rear stage of the line L2 by one stage in the column direction Y), is the line L3.

As described above, the specification discloses the following configurations.

A disclosed imaging device includes a solid-state image-capture element comprising a first line on which first phase difference detection pixels, each of which receiving one of a pair of light bundles passing through aperture areas of an imaging optical system located at different positions, are arranged in a phase difference detection direction and a second line on which second phase difference detection pixels, each of which receiving the other of the pair of light bundles, are arranged in the phase difference detection direction, the first line and the two second lines being alternately arranged in a direction orthogonal to the phase difference detection direction; an image-capture element driving unit that reads out a signal from the solid-state image-capture element by a rolling shutter method; a phase difference information calculation unit that calculates a first phase difference amount between a first signal group, which is read out from the first phase difference detection pixels of the first line, and a second signal group, which is read out from the second phase difference detection pixels on the second line from which signals are read out later than the first line and which is parallel with a rear stage of the first line and a second phase difference amount between the second signal group and a third signal group, which is read out from the first phase difference detection pixels on the first line from which signals are read out later than the second line and which is parallel with a rear stage of the second line by using the first signal group, the second signal group and the third signal group and calculates phase difference information by a calculation using the first phase difference amount and the second phase difference amount, and a focusing control unit that controls a focus of the imaging optical system on the basis of the phase difference information calculated by the phase difference information calculation unit.

In the disclosed imaging device, the phase difference information calculation unit selects and executes any one of first processing and second processing on the basis of at least one of an imaging condition and a subject condition, as processing for calculating the phase difference information, the first processing is processing of calculating the phase difference information by using both the first phase difference amount and the second phase difference amount, and the second processing is processing of calculating any one of the first phase difference amount and the second phase difference amount, as the phase difference information.

In the disclosed imaging device, the solid-state image-capture element comprises a third line on which image-capture pixels receiving both of the pair of light bundles are arranged in the phase difference detection direction, the third line is arranged at least one of between the first line and the second line from which signals are read out later than the first line and which is parallel with the rear stage of the first line and between the second line and the first line from which signals are read out later than the second line and which is parallel with the rear stage of the second line, and when performing the second processing, if N1≤N2, where N1 is the number of the third lines between a line of an output source of the first signal group and a line of an output source of the second signal group and N2 is the number of the third lines between the line of the output source of the second signal group and a line of an output source of the third signal group, the phase difference information calculation unit calculates the first phase difference amount, as the phase difference information, and if N1>N2, the phase difference information calculation unit calculates the second phase difference amount, as the phase difference information.

In the disclosed imaging device, the solid-state image-capture element includes a third line on which image-capture pixels receiving both of the pair of light bundles are arranged in the phase difference detection direction, and the third line is arranged between the first line and the second line from which signals are read out later than the first line and which is parallel with the rear stage of the first line and between the second line and the first line from which signals are read out later than the second line and which is parallel with the rear stage of the second line.

In the disclosed imaging device, when the number of the third lines between the line of the output source of the first signal group and the line of the output source of the second signal group is denoted with N1 and the number of the third lines between the line of the output source of the second signal group and the line of the output source of the third signal group is denoted with N2, the first processing comprises a calculation of multiplying at least one of the first phase difference amount and the second phase difference amount by a factor enabling a distortion influence amount of (N1+1) lines included in the first phase difference amount on the phase difference information, which is caused due to the rolling shutter method, and a distortion influence amount of the (N2+1) lines included in the second phase difference amount on the phase difference information, which is caused due to the rolling shutter method, to be the same and then subtracting the second phase difference amount from the first phase difference amount.

A disclosed focusing control method is a focusing control method in an imaging device comprising a solid-state image-capture element that comprises a first line on which first phase difference detection pixels, each of which receiving one of a pair of light bundles passing through aperture areas of an imaging optical system located at different positions, are arranged in a phase difference detection direction and a second line on which second phase difference detection pixels, each of which receiving the other of the pair of light bundles, are arranged in the phase difference detection direction, the first line and the two second lines being alternately arranged in a direction orthogonal to the phase difference detection direction. The focusing control method includes steps of reading out a signal from the solid-state image-capture element by a rolling shutter method; calculating a first phase difference amount between a first signal group, which is read out from the first phase difference detection pixels of the first line, and a second signal group, which is read out from the second phase difference detection pixels on the second line from which signals are read out later than the first line and which is parallel with a rear stage of the first line and a second phase difference amount between the second signal group and a third signal group, which is read out from the first phase difference detection pixels on the first line from which signals are read out later than the second line and which is parallel with a rear stage of the second line by using the first signal group, the second signal group and the third signal group and calculating phase difference information by a calculation using the first phase difference amount and the second phase difference amount, and controlling a focus of the imaging optical system on the basis of the calculated phase difference information.

In the disclosed focusing control method, in the step of calculating the phase difference information, any one of first processing and second processing is selectively executed on the basis of at least one of an imaging condition and a subject condition, as processing for calculating the phase difference information, the first processing is processing of calculating the phase difference information by using both the first phase difference amount and the second phase difference amount, and the second processing is processing of calculating the first phase difference amount or the second phase difference amount, as the phase difference information.

In the disclosed focusing control method, the solid-state image-capture element comprises a third line on which image-capture pixels receiving both of the pair of light bundles are arranged in the phase difference detection direction, the third line is arranged at least one of between the first line and the second line from which signals are read out later than the first line and which is parallel with the rear stage of the first line and between the second line and the first line from which signals are read out later than the second line and which is parallel with the rear stage of the second line, and in the step of calculating the phase difference information, when performing the second processing, if N1≤N2, where N1 is the number of the third lines between a line of an output source of the first signal group and a line of an output source of the second signal group and N2 is the number of the third lines between the line of the output source of the second signal group and a line of an output source of the third signal group, the first phase difference amount is calculated as the phase difference information, and if N1>N2, the second phase difference amount is calculated as the phase difference information.

In the disclosed focusing control method, the solid-state image-capture element includes a third line on which image-capture pixels receiving both of the pair of light bundles are arranged in the phase difference detection direction, and the third line is arranged between the first line and the second line from which signals are read out later than the first line and which is parallel with the rear stage of the first line and between the second line and the first line from which signals are read out later than the second line and which is parallel with the rear stage of the second line.

In the disclosed focusing control method, when the number of the third lines between the line of the output source of the first signal group and the line of the output source of the second signal group is denoted with N1 and the number of the third lines between the line of the output source of the second signal group and the line of the output source of the third signal group is denoted with N2, the first processing comprises a calculation of multiplying at least one of the first phase difference amount and the second phase difference amount by a factor enabling a distortion influence amount of (N1+1) lines included in the first phase difference amount on the phase difference information, which is caused due to the rolling shutter method, and a distortion influence amount of the (N2+1) lines included in the second phase difference amount on the phase difference information, which is caused due to the rolling shutter method, to be the same and then subtracting the second phase difference amount from the first phase difference amount.

According to the imaging device and focusing control method of the invention, it is possible to detect the phase difference with high precision and to perform the focusing control with high precision by reducing the influence of the distortion caused due to the rolling shutter, without an additional circuit.

Although the invention has been specifically with reference to the specific illustrative embodiments, it is apparent to one skilled in the art that a variety of changes and modifications can be made without departing from the spirit and scope of the invention.

What is claimed is:

1. An imaging device comprising:
a solid-state image-capture element comprising a first line on which first phase difference detection pixels, each of which receiving one of a pair of light bundles passing through aperture areas of an imaging optical system located at different positions, are arranged in a phase difference detection direction and a second line on which second phase difference detection pixels, each of which receiving the other of the pair of light bundles, are arranged in the phase difference detection direction, the first line and the second line being alternately arranged in a direction orthogonal to the phase difference detection direction;
an image-capture element driving unit that reads out a signal from the solid-state image-capture element by a rolling shutter method;
a phase difference information calculation unit that calculates a first phase difference amount between a first signal group, which is read out from the first phase difference detection pixels of the first line, and a second signal group, which is read out from the second phase difference detection pixels on the second line from which signals are read out later than the first line and which is parallel with a rear stage of the first line and a second phase difference amount between the second signal group and a third signal group, which is read out from the first phase difference detection pixels on the first line from which signals are read out later than the second line and which is parallel with a rear stage of the second line by using the first signal group, the second signal group and the third signal group and calculates phase difference information by a calculation using the first phase difference amount and the second phase difference amount, and
a focusing control unit that controls a focus of the imaging optical system on the basis of the phase difference information calculated by the phase difference information calculation unit.

2. The imaging device according to claim 1, wherein the phase difference information calculation unit selects and executes any one of first processing and second processing on the basis of at least one of an imaging condition and a subject condition, as processing for calculating the phase difference information,
wherein the first processing is processing of calculating the phase difference information by using both the first phase difference amount and the second phase difference amount, and
wherein the second processing is processing of calculating any one of the first phase difference amount and the second phase difference amount, as the phase difference information.

3. The imaging device according to claim 2, wherein the solid-state image-capture element comprises a third line on which image-capture pixels receiving both of the pair of light bundles are arranged in the phase difference detection direction,
wherein the third line is arranged at least one of between the first line and the second line from which signals are read out later than the first line and which is parallel with the rear stage of the first line and between the second line and the first line from which signals are read out later than the second line and which is parallel with the rear stage of the second line, and
wherein when performing the second processing, if N1≤N2, where N1 is the number of the third lines between a line of an output source of the first signal group and a line of an output source of the second signal group and N2 is the number of the third lines between the line of the output source of the second signal group and a line of an output source of the third signal group, the phase difference information calculation unit calculates the first phase difference amount, as the phase difference information, and if N1>N2, the phase difference information calculation unit calculates the second phase difference amount, as the phase difference information.

4. The imaging device according to claim 1, wherein the solid-state image-capture element comprises a third line on which image-capture pixels receiving both of the pair of light bundles are arranged in the phase difference detection direction, and
wherein the third line is arranged between the first line and the second line from which signals are read out later than the first line and which is parallel with the rear stage of the first line and between the second line and the first line from which signals are read out later than the second line and which is parallel with the rear stage of the second line.

5. The imaging device according to claim 3, wherein when the number of the third lines between the line of the output source of the first signal group and the line of the output source of the second signal group is denoted with N1 and the number of the third lines between the line of the output source of the second signal group and the line of the output source of the third signal group is denoted with N2, the first processing comprises a calculation of multiplying at least one of the first phase difference amount and the second phase difference amount by a factor enabling a distortion influence amount of (N1+1) lines included in the first phase difference amount on the phase difference information, which is caused due to the rolling shutter method, and a distortion influence amount of the (N2+1) lines included in the second phase difference amount on the phase difference information, which is caused due to the rolling shutter method, to be the same and then subtracting the second phase difference amount from the first phase difference amount.

6. A focusing control method in an imaging device comprising a solid-state image-capture element that comprises a first line on which first phase difference detection pixels, each of which receiving one of a pair of light bundles passing through aperture areas of an imaging optical system located at different positions, are arranged in a phase difference detection direction and a second line on which second phase difference detection pixels, each of which receiving the other of the pair of light bundles, are arranged in the phase difference detection direction, the first line and the second line being alternately arranged in a direction orthogonal to the phase difference detection direction, the focusing control method comprising steps of:
reading out a signal from the solid-state image-capture element by a rolling shutter method;
calculating a first phase difference amount between a first signal group, which is read out from the first phase difference detection pixels of the first line, and a second signal group, which is read out from the second phase difference detection pixels on the second line from which signals are read out later than the first line and which is parallel with a rear stage of the first line and a second phase difference amount between the second signal group and a third signal group, which is read out from the first phase difference detection pixels on the first line from which signals are read out later than the second line and which is parallel with a rear stage of the second line by using the first signal group, the second signal group and the third signal group and calculating phase difference information by a calculation using the first phase difference amount and the second phase difference amount, and
controlling a focus of the imaging optical system on the basis of the calculated phase difference information.

7. The focusing control method according to claim 6, wherein in the step of calculating the phase difference information, any one of first processing and second processing is selectively executed on the basis of at least one of an imaging condition and a subject condition, as processing for calculating the phase difference information,
wherein the first processing is processing of calculating the phase difference information by using both the first phase difference amount and the second phase difference amount, and
wherein the second processing is processing of calculating the first phase difference amount or the second phase difference amount, as the phase difference information.

8. The focusing control method according to claim 7, wherein the solid-state image-capture element comprises a third line on which image-capture pixels receiving both of the pair of light bundles are arranged in the phase difference detection direction,
wherein the third line is arranged at least one of between the first line and the second line from which signals are read out later than the first line and which is parallel with the rear stage of the first line and between the second line and the first line from which signals are read out later than the second line and which is parallel with the rear stage of the second line, and
wherein in the step of calculating the phase difference information, when performing the second processing, if N1≤N2, where N1 is the number of the third lines between a line of an output source of the first signal group and a line of an output source of the second signal group and N2 is the number of the third lines between the line of the output source of the second signal group and a line of an output source of the third signal group, the first phase difference amount is calculated as the phase difference information, and if N1>N2, the second phase difference amount is calculated as the phase difference information.

9. The focusing control method according to claim 6, wherein the solid-state image-capture element comprises a third line on which image-capture pixels receiving both of the pair of light bundles are arranged in the phase difference detection direction, and
wherein the third line is arranged between the first line and the second line from which signals are read out later than the first line and which is parallel with the rear stage of the first line and between the second line and the first line from which signals are read out later than the second line and which is parallel with the rear stage of the second line.

10. The focusing control method according to claim 8, wherein when the number of the third lines between the line of the output source of the first signal group and the line of the output source of the second signal group is denoted with N1 and the number of the third lines between the line of the output source of the second signal group and the line of the output source of the third signal group is denoted with N2, the first processing comprises a calculation of multiplying at least one of the first phase difference amount and the second phase difference amount by a factor enabling a distortion influence amount of (N1+1) lines included in the first phase difference amount on the phase difference information, which is caused due to the rolling shutter method, and a distortion influence amount of the (N2+1) lines included in the second phase difference amount on the phase difference information, which is caused due to the rolling shutter method, to be the same and then subtracting the second phase difference amount from the first phase difference amount.

* * * * *